3,452,026
SUBSTITUTED 1,2,3,4-TETRAHYDROQUINOLINES
Yvon G. Perron and Gerry Kavadias, St. Lambert,
 Quebec, Canada, assignors, by mesne assignments,
 to Bristol-Myers Company, New York, N.Y., a
 corporation of Delaware
No Drawing. Filed Mar. 15, 1966, Ser. No. 534,404
Int. Cl. C07d *33/50*
U.S. Cl. 260—288                    14 Claims

ABSTRACT OF THE DISCLOSURE

Substituted 1,2,3,4-tetrahydroquinolines exhibit analgesic, spinal depressant and anorexic activity and are useful as analgesic, spinal depressants and anorexics.

---

This invention relates to novel compounds. More particularly, this invention relates to novel compounds which possess valuable therapeutic utility as analgesics, spinal depressants and anorexics and to processes useful in the preparation thereof.

It is an object of the present invention to provide a new class of therapeutic compounds. It is another object of the present invention to provide novel compounds having therapeutic utility. It is a further object of the present invention to provide a process for preparing the novel therapeutic compounds.

These and other objects which may appear as the specification proceeds are achieved by the invention which comprises the provision of compounds selected from the group consisting of compounds having the following formula I 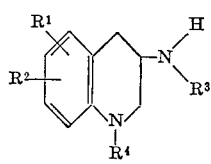

wherein:

$R^1$ and $R^2$ each represent a member selected from the group consisting of hydrogen, (lower)alkyl, (lower) alkoxy, chloro, bromo, fluoro, iodo, trifluromethyl, hydroxy, (lower)alkylthio, (lower)dialkylamino, amino, (lower)alkylamino, and phenyl(lower)alkylamino, e.g. benzylamino, phenethylamino, phenylpropylamino, phenylisopropylamino and phenylhexylamino, $R^3$ is a member selected from the group consisting of (lower)alkyl, phenyl(lower)alkyl and cycloalkyl (lower)alkyl radicals having from 3 to 7 carbon atoms inclusive in the cycloalkyl moiety, e.g. cyclopropyl (lower)alkyl, cyclobutyl (lower)alkyl, cyclopentyl (lower)alkyl, cyclohexyl (lower)alkyl and cycloheptyl (lower)alkyl, $R^2$ is a member selected from the group consisting of (lower)alkyl and phenyl(lower)alkyl);

and the pharmaceutically acceptable nontoxic salts thereof.

The pharmaceutically acceptable nontoxic salts include the organic and inorganic acid addition salts, e.g., those prepared from acids such as hydrochloric, sulfuric, sulfamic, tartaric, fumaric, hydrobromic, hydriodic, glycolic, citric, maleic, phosphoric, succinic, acetic nitric and the like. Such salts are prepared by conventional methods.

The term "(lower)alkyl" as used herein means both straight and branched chain alkyl radicals containing from 1 to 8 carbon atoms, e.g. methyl, ethyl, propyl, isopropyl, butyl, isobutyl, t-butyl, amyl, hexyl, 2-ethylhexyl, etc.

Similarly, where the term "(lower)" is used as part of the description of another group, e.g., (lower)alkoxy, it refers to the alkyl portion of such group which is therefore as described on connection with (lower)alkyl.

A preferred embodiment of the present invention consists of the compounds of the formula II 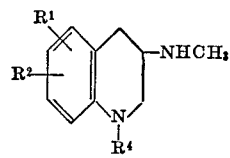

wherein $R^1$, $R^2$ and $R^4$ are as described above. In the most preferred embodiment of the present invention, $R^4$ is (lower)alkyl.

The compounds of this invention are prepared by reacting a compound of the formula

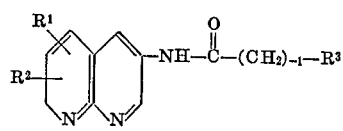

wherein $R^1$, $R^2$ and $R^3$ are as represented above, with an alkyl or aralkyl halide of the formula

IV                    $R^4X$ wherein X is an anion, e.g. chloride, iodide or bromide, and $R^4$ is as represented above, preferably in an inert solvent such as acetone, to produce the quaternary salt of the compound of Formula III having the formula

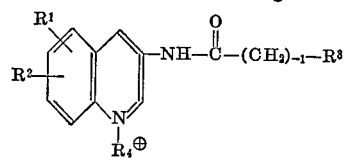

wherein $R^1$, $R^2$, and $R^4$ are as represented above. Reduction of the compound of Formula V under mild conditions, by for example hydrogenation in the presence of platinum oxide preferably in an inert solvent such as methanol, or reduction with sodium borohydride, produces the compound having the formula

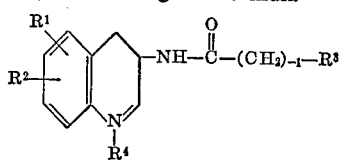

wherein $R^1$, $R^2$, $R^3$ and $R^4$ are as represented above. Further reduction under stronger conditions, e.g., lithium aluminum hydride, preferably in the presence of an inert solvent such as dioxane or ether, produces the novel compounds of Formula I.

The compounds of this invention wherein $R^3$ is methyl can also be prepared according to the following reaction scheme:

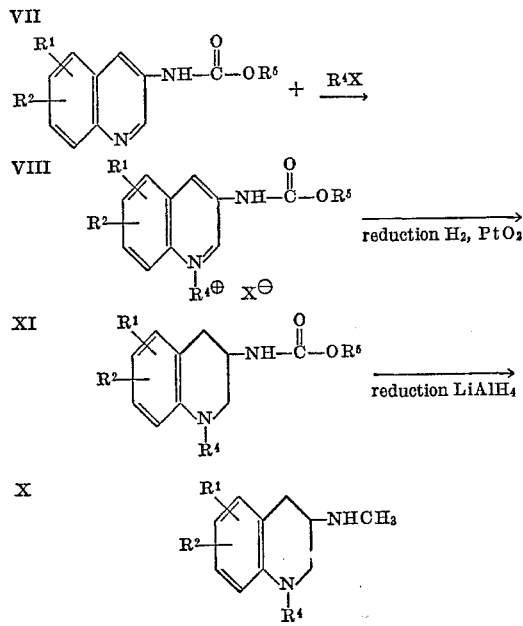

wherein $R^1$, $R^2$, $R^4$ and X are as described above and $R^5$ is (lower)alkyl or aralkyl. A 3-carbalkoxy or aralkoxy aminoquinoline of Formula VII is reacted with an alkyl or aralkyl halide to produce the quaternary salt (Formula VIII). Reduction of the quaternary salt under mild conditions by, for example, hydrogenation in the presence of platinum oxide preferably in an inert solvent such as methanol or reduction with sodium borohydride produces a 1-alkyl or aralkyl-3-carbalkoxy or aralkoxyamino-1,2,3,4-tetrahydroquinoline (Formula IX). Further reduction of the compound of Formula IX with for example lithium aluminum hydride preferably in an inert solvent such as dioxane or ether produces the compound of Formula X.

For the preparation of compounds of this invention wherein $R^1$ or $R^2$ is amino, the corresponding nitro-substituted 3-aminoquinoline should be used as the starting material in the foregoing procedures. Reduction to the amino group takes place dring the reduction steps of the procedures.

The starting materials used to prepare the compounds of this invention are either well known in the art, or easily prepared in accordance with standard organic procedures previously described in the literature. For example, the compounds of Formula III can be prepared by reacting a 3-aminoquinoline (described on page 236 of volume IV, The Chemistry of the Carbon Compounds by Victor von Richter, edited by Richard Anschutz, translated from the twelfth German edition, Elsevier Publishing Co., Inc., New York, N.Y., 1947), with an acid halide, or can be prepared by the method described by Colonna, Gazz Chim. Ital. 67, 46–53 (1937).

The compounds of Formula VII can be prepared by reacting a 3-aminoquinoline with a chloroformate, e.g., ethylchloroformate, according to the procedure described by Katritzky, J. Chem. Soc., 4385–4390 (1957), or can be prepared by the procedure described by Raison, J. Chem. Soc., 2070–2074 (1949).

The compounds of this invention may be administered as the free bases or in the form of their nontoxic addition salts. They may be compounded and formulated into pharmaceutical preparations in unit dosage form for oral or parenteral administration with organic or inorganic solid materials or liquids which are pharmaceutically acceptable carriers. The compositions may take the form of tablets, powders, granules, capsules, supensions, solutions and the like. Such compositions are considered within the scope of this invention.

The compositions of this invention when administered orally or parenterally, in an effective amount, are effective analgesic, spinal depressant and anorexic agents.

The following examples are intended to illustrate the invention described herein without unduly restricting it.

EXAMPLE 1

Preparatin of N-carbethoxy-3-aminoquinoline

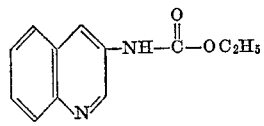

3-aminoquinoline (96.4 gm., 0.668 mol) was added to 250 ml. of pyridine and the mixture stirred and cooled to 0° C. Ethylchloroformate (87 gm., 0.8016 mol) was added dropwise over a period of 30 minutes. Additional pyridine was added during the addition of ethylchloroformate. The mixture was stirred at room temperature for 18 hours. The mixture was then poured into 1 liter of ice cold water; the product precipitated and was separated by filtration. After washing with water to remove traces of pyridine chloride, the precipitate was recrystallized from 300 ml. of ethanol to yield the product, N-carbethoxy-3-aminoquinoline.

EXAMPLE 2

Preparation of 1-methyl-3-methylamino-1,2,3,4-tetrahydroquinoline

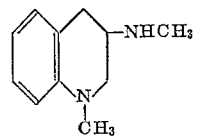

(a) 3-carbethoxyaminoquinoline methiodide.—A solution containing 43.1 gm. (0.2 mol) of N-carbethoxy-3-aminoquinoline and 56.8 gm. (0.4 mol) of methyl iodide in 250 ml. of reagent acetone was heated at reflux temperature. After one hour, a yellow crystalline compound began to separate from the boiling solution. Refluxing of the reaction mixture was continued for twelve hours. The reaction mixture was then cooled and the crystalline reaction product collected by filtration. After washing with acetone and drying, there was obtained 67 gm. of crystalline 3-carbethoxyaminoquinoline methiodide, M.P. 187–190° C. (dec.).

Analysis.—Calcd. for $C_{13}H_{15}IN_2O_2$: C, 43.58; H, 4.22; N, 7.96. Found: C, 43.13; H, 4.10; N, 8.07%.

(b) 3 - carbethoxyamino - 1 - methyl - 1,2,3,4 - tetrahydroquinoline.—A suspension of 20 gm. (0.056 mol) of N-carbethoxy-3-aminoquinoline methiodide in 250 ml. of ethanol was hydrogenated in the presence of platinum oxide (250 mgm.) at room temperature and initial hydrogen pressure of 46 p.s.i. After 24 hours, 60% (6 p.s.i.) of the theoretical amount of hydrogen had been absorbed. A suspension of 250 mgm. of fresh catalyst in 5 ml. of ethanol was then added and the hydrogenation was continued for an additional 24 hours. This resulted in the uptake of a further 30% (3 p.s.i.) of the theoretical amount of hydrogen. The catalyst was filtered off, washed with 50 ml. of ethanol, and the combined filtrate decolorized with charcoal. The brown solution thus obtained was evaporated to dryness and the residue dissolved in 250 ml. of chloroform. The resulting solution was shaken with 130 ml. of 10% aqueous sodium carbonate solution. The chloroform solution was washed thrice with 150 ml. portions of water or until the washings were colorless. After dyring over magnesium sulfate, the chloroform solution was treated with 30 gm. of aluminum oxide thus yielding a colorless solution. Removal of the solvent afforded 11.3 gm. of solid which after recrystallization from 60 ml. of petroleum ether (B.P. 60–75° C.) yielded 9 gm. of crystalline 3 - carbethoxyamino - 1 - methyl - 1,2,3,4 - tetrahydroquinoline material melting at 67–69° C. The infrared spectrum of this product is consistent with the expected structure. From the mother liquors a further 1.6 gm. of material was isolated.

*Analysis.*—Calcd. for $C_{13}H_{18}N_2O_2$: C, 66.63; H, 7.74; N, 11.95%. Found: C, 66.87; H, 7.70; N, 12.64%.

(c) 1 - methyl - 3 - methylamino - 1,2,3,4 - tetrahydroquinoline and the dihydrochloride.—A stirred suspension of 1.71 gm. (0.045 mol) of lithium aluminum hydride in 40 ml. of dioxane (reagent grade) was heated at reflux temperature. The source of heat was removed, and a solution of 7.0 gm. (0.03 mol) of 1-methyl-3-carbethoxyamino-1,2,3,4 - tetrahydroquinoline in 30 ml. of dioxane was added at a rate sufficient to cause a brisk reflux of the reaction mixture. After the addition had been completed (ca. 10 minutes) the stirred reaction mixture was maintained at reflux temperature for a period of 3 hours. At the end of this period, the solution was cooled and decomposed by the dropwise addition of water (15 ml.). The precipitated solid was removed by filtration and washed with 100 ml. of ether. The combined filtrate and washings were evaporated to give 4.8 gm. of thick syrup 1 - methyl - 3 - methylamino - 1,2,3,4 - tetrahydroquinoline, which infrared spectrum is consistent with the expected structure. The hydrochloride salt of this compound was prepared in dry ether with dry hydrogen chloride gas. After recrystallization from ethanol-ether, there was obtained 4.5 gm. of 1-methyl-3-methylamino-1,2,3,4-tetrahydroquinoline dihydrochloride melting at 196–199° C. (dec.).

*Analysis.*—Calcd. for $C_{11}H_{16}N_2 \cdot 2HCl$: C, 53.01; H, 7.28; Cl, 28.45%. Found: C, 53.17; H, 7.35; Cl, 28.46%.

This compound exhibited useful analgesic, spinal depressant and anorexis properties in animals.

The 1 - methyl - 3 - methylamino - 1,2,3,4 - tetrahydroquinoline dihydrochloride described above was tested for analgesic activity by the phenylquinone test of Sigmund et al., Proc. Soc. Expt'l. Biol. and the Med. 95, 729 (1957) in which an analgesic reduces the induced writhing of the mice. At dosages as low as 75 mgm./kg. p.o. in mice given 50 minutes before the phenyl-p-quinone was injected, the reduction in induced writhing at the end of the first hour was found to be greater than 30% for this compound. This indicated that this compound is an analgesic agent.

Doses of this compound as low as 75 mgm./kg. p.o. in mice exhibited spinal depressant activity, indicating internuncial blocking, by the method of J. W. Bastian and S. A. Ridlon, Fed. Proc. 17(1), 1367 (1958).

In the mouse anorexia assay, this compound was effective at 100 and at 50 mgm./kg. p.o. In this assay, groups of 5 mice, starved for 16–17 hours, are placed in a cage, given the drug to be tested, and after another 30 minutes are given a weighed amount of food. One hour after presenting the food, the food dish is removed and weighed. Control mice, i.e., dosed with water, eat an average of 6.2 gm. per group of 5 mice. Significant anorexic activity is exhibited when a group of 5 treated mice eat less than 2 gm. in the hour. In various tests, this compound reduced the food intake to amounts in the range of 0–2 gm. at oral dosages of 50 and 100 mgm./kg.

EXAMPLE 3

Preparation of 3-methylamino-1-phenethyl-1,2,3,4-tetrahydroquinoline

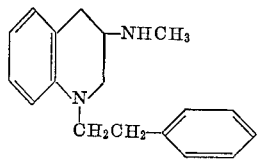

(a) 3-carbethoxyamino-1-phenethylquinolinium bromide.—A mixture consisting of 4 gm. of 3-carboethoxyaminoquinoline and 25 ml. (excess) of phenethyl bromide was heated in an oil bath during 2 hours. (Bath T°=120–130° C.). At the end of this period, the reaction mixture which had solidified to a yellow mass, was washed with 20 ml. of benzene to remove the excess phenethyl bromide and the resulting slurry was filtered. The yellow crystalline compound was washed again on the filter with a small amount of benzene and then dried. The crystalline material thus obtained was recrystallized from an ethanol-ether mixture thus yielding 5 gm. of 3-carbethoxyamino-1-phenethylquinolinium bromide melting at 182–184° C. (dec.). The infrared spectrum is consistent with the assigned structure.

*Analysis.*—Calcd. for $C_{20}H_{21}N_2O_2Br$: C, 59.86; H, 5.27%. Found: C, 58.46; H, 5.75%

(b) 3-carbethoxyamino-1-phenethyl-1,2,3,4-tetrahydroquinoline hydrobromides.—A solution containing 10.13 gm. (0.025 mol) of the quaternary ammonium salt in 100 ml. of reagent methanol was hydrogenated at room temperature in the presence of platinum oxide (400 mgm.) at an initial pressure of 47 p.s.i. The theoretical quantity of hydrogen was absorbed in ca. 2 hours. The catalyst was filtered off, washed with methanol and the combined filtrate and washings was concentrated at reduced pressure yielding 9.5 gm. of an amorphous solid, 3 - carbethoxyamino - 1 - phenethyl - 1,2,3,4 - tetrahydroquinoline hydrobromide, which could not be recrystallized.

*Analysis.*—Calcd. for $C_{20}H_{24}N_2O_2 \cdot Hbr$: C, 59.88; H, 6.22%. Found: C, 58.75; H, 6.40%.

The amorphous solid hydrobromide was neutralized with aqueous sodium hydroxide, the free base thus obtained was taken up in ether and the resulting solution dried over magnesium sulfate. Upon evaporation of the solvent, there was obtained 5.06 gm. of unstable crude amorphous solid (M.P. 105–125° C.) which was used in c., below, without further purification.

(c) 3-methylamino - 1 - phenethyl-1,2,3,4-tetrahydroquinoline.—A stirred suspension of 1 gm. of lithium aluminum hydride in 30 ml. of reagent dioxane was heated to reflux temperature. The source of heat was removed and a solution of 5 gm. (0.015 mol) of 3-carbethoxyamino-1-phenethyl-1,2,3,4-tetrahydroquinoline in 30 ml. of dioxane was added at a rate sufficient to cause a brisk reflux of the reaction mixture. After the addition had been completed, the stirred reaction mixture was maintained at reflux temperature during 20 hours. At the end of this period, the solution was cooled and decomposed by the dropwise addition of water. The precipitated solid was removed by filtration and washed with a small quantity of dioxane. Evaporation of the filtrate at reduced pressure yielded 3.12 gm. of a dark red syrup. The oxalate salt of this compound was prepared in ether using about 5 gm. of oxalic acid. After recrystallization from an ethanol-ether mixture, there was obtained 2.5 gm. of a crystalline oxalate which crystallized with a molecule of water. This compound, 3-methylamino-1-phenethyl-1,2,3,4-tetrahydroquinoline, did not melt but started to decompose at about 145° C.

*Analysis.*—Calcd. for $C_{18}H_{22}N_2 \cdot C_2H_2O_4 \cdot H_2O$: C, 64.15; H, 6.99%. Found: C, 64.46; H, 6.89%.

EXAMPLE 4

When, in the procedure of Example 2, N-carbethoxy-3-aminoquinoline is replaced by an equal molar amount of:

5-methyl-3-carbethoxyaminoquinoline,
6-chloro-3-carbethoxyaminoquinoline,
5,6-dichloro-3-carbethoxyaminoquinoline,
7-fluoro-3-carbethoxyaminoquinoline,
8-iodo-3-carbethoxyaminoquinoline,
5-trifluoromethyl-3-carbethoxyaminoquinoline,
6-methoxy-3-carbethoxyaminoquinoline, 5-methylthio-3-carbethoxyaminoquinoline,
5-nitro-3-carbethoxyaminoquinoline,
5-methylamino-3-carbethoxyaminoquinoline,
6-benzylamino-3-carbethoxyaminoquinoline,
6-hydroxy-3-carbethoxyaminoquinoline,
7-iodo-3-carbethoxyaminoquinoline,
3-acetamidoquinoline,
3-propionamidoquinoline,
3-benzoylamidoquinoline,
3-phenylacetamidoquinoline,
3-cyclopropylcarbonylaminoquinoline,
3-cyclohexylcarbonylaminoquinoline,
3-cyclobutylcarbonylaminoquinoline,
3-cyclopentylcarbonylaminoquinoline,
3-cycloheptylcarbonylaminoquinoline,
5-chloro-7-methyl-3-cyclopropylcarbonylaminoquinoline,
6-propyl-3-acetamidoquinoline and
6-dimethylamino-3-carbethoxyaminoquinoline, there are obtained, 1,5-dimethyl-3-methylamino-1,2,3,4-tetrahydroquinoline,
6-chloro-1-methyl-3-methylamino-1,2,3,4-tetrahydroquinoline,
5,6-dichloro-1-methyl-3-methylamino-1,2,3,4-tetrahydroquinoline,
7-fluoro-1-methyl-3-methylamino-1,2,3,4-tetrahydroquinoline,
8-iodo-1-methyl-3-methylamino-1,2,3,4-tetrahydroquinoline,
5-trifluoromethyl-1-methyl-3-methylamino-1,2,3,4-tetrahydroquinoline,
6-methoxy-1-methyl-3-methylamino-1,2,3,4-tetrahydroquinoline,
5-methylthio-1-methyl-3-methylamino-1,2,3,4-tetrahydroquinoline,
5-amino-1-methyl-3-methylamino-1,2,3,4-tetrahydroquinoline,
1-methyl-3,5-dimethylamino-1,2,3,4-tetrahydroquinoline,
6-benzylamino-1-methyl-3-methylamino-1,2,3,4-tetrahydroquinoline,
6-hydroxy-1-methyl-3-methylamino-1,2,3,4-tetrahydroquinoline,
7-iodo-1-methyl-3-methylamino-1,2,3,4-tetrahydroquinoline,
1-methyl-3-ethylamino-1,2,3,4-tetrahydroquinoline,
1-methyl-3-propylamino-1,2,3,4-tetrahydroquinoline,
1-methyl-3-benzylamino-1,2,3,4-tetrahydroquinoline,
1-methyl-3-phenethylamino-1,2,3,4-tetrahydroquinoline,
1-methyl-3-cyclopropylmethylamino-1,2,3,4-tetrahydroquinoline,
1-methyl-3-cyclohexylmethylamino-1,2,3,4-tetrahydroquinoline,
1-methyl-3-cyclobutylmethylamino-1,2,3,4-tetrahydroquinoline,
1-methyl-3-cyclopentylmethylamino-1,2,3,4-tetrahydroquinoline,
1-methyl-3-cycloheptylmethylamino-1,2,3,4-tetrahydroquinoline,
5-chloro-1,7-dimethyl-3-cyclopropylmethylamino-1,2,3,4-tetrahydroquinoline,
6-propyl-1-methyl-3-ethylamino-1,2,3,4-tetrahydroquinoline and
6-dimethylamino-1-methyl-3-methylamino-1,2,3,4-tetrahydroquinoline, respectively.

EXAMPLE 5

When in the procedure of Example 2, methyl iodide is replaced by an equal molar amount of: ethyl iodide, propyl bromide, isopropyl bromide, butyl bromide, sec.-butyl bromide, tert.-butyl bromide, hexyl bromide and phenethyl bromide, there are obtained, 1-ethyl-3-methylamino-1,2,3,4-tetrahydroquinoline,
1-propyl-3-methylamino-1,2,3,4-tetrahydroquinoline,
1-isopropyl-3-methylamino-1,2,3,4-tetrahydroquinoline,
1-butyl-3-methylamino-1,2,3,4-tetrahydroquinoline,
1-sec.-butyl-3-methylamino-1,2,3,4-tetrahydroquinoline,
1-tert.-butyl-3-methylamino-1,2,3,4-tetrahydroquinoline,
1-hexyl-3-methylamino-1,2,3,4-tetrahydroquinoline and
1-phenethyl-3-methylamino-1,2,3,4-tetrahydroquinoline, respectively.

While the foregoing invention has been described and exemplified in terms of its preferred embodiment, those skilled in the art will appreciate that modifications can be made without departing from the spirit and scope of this invention.

What is claimed is:

1. A compound selected from the group consisting of compounds of the formula

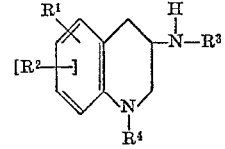

$R^1$ is a member selected from the group consisting of hydrogen, chloro, bromo, fluoro, iodo, trifluoromethyl, methyl, ethyl, methoxy, ethoxy, methylthio, ethylthio, dimethylamino and diethylamino;

$R^3$ is a member selected from the group consisting of (lower)alkyl, phenyl(lower)alkyl and cycloalkyl (lower)alkyl having from 3 to 7 carbon atoms, inclusive in the cycloalkyl moiety, and $R^4$ is a member selected from the group consisting of (lower)alkyl and phenyl(lower)alkyl;

and the pharmaceutically acceptable nontoxic salts thereof.

2. A compound of claim 1 having the formula

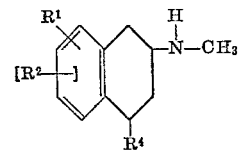

wherein:

$R^1$ is a member selected from the group consisting of hydrogen, methyl, ethyl, methoxy, ethoxy, chloro, bromo, fluoro, iodo, trifluoromethyl, methylthio, ethylthio, dimethylamino and diethylamino, and $R^4$ is a member selected from the group consisting of (lower)alkyl and phenyl(lower)alkyl.

3. A compound of claim 1 having the formula

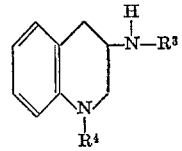

wherein:

$R^3$ is (lower)alkyl, and $R^4$ is (lower)alkyl.

4. A compound of claim 1 having the formula

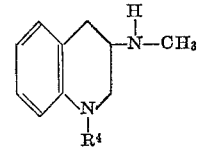

wherein $R^4$ is (lower)alkyl.

5. A compound of claim 1 having the formula

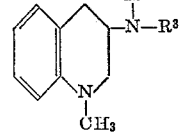

wherein $R^3$ is (lower)alkyl.

6. The compound having the formula

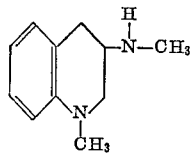

7. The pharmaceutically acceptable nontoxic salts of the compound of claim 6.

8. The compound having the formula

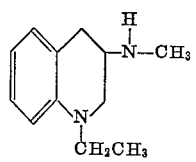

9. The compound having the formula

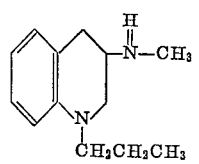

10. The compound having the formula

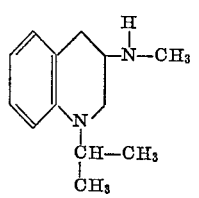

11. The compound having the formula

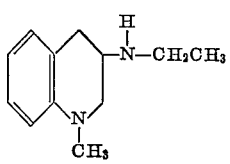

12. The compound having the formula

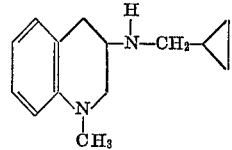

13. The compound having the formula

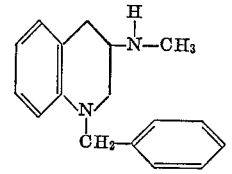

14. The compound having the formula

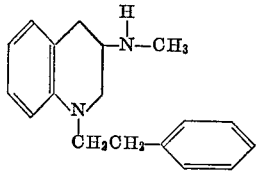

References Cited

UNITED STATES PATENTS

| | | |
|---|---|---|
| 2,077,903 | 4/1937 | Schlichenmaier et al. |
| 2,098,927 | 11/1937 | Schornig. |
| 2,151,532 | 3/1939 | Schmidt et al. _____ 260—288 X |
| 2,387,751 | 10/1945 | Dickey et al. _____ 260—288 |
| 2,554,737 | 5/1951 | Haefliger et al. ____ 260—288 X |
| 2,786,845 | 3/1957 | Mauss et al. _____ 260—288 |
| 3,098,010 | 7/1963 | Everett et al. _____ 167—65 |

OTHER REFERENCES

Chiavaralli et al.: Chem. Abstr., vol. 47, col. 6944-6 (1953).

ALEX MAZEL, Primary Examiner.

D. G. DAUS, Assistant Examiner.

U.S. Cl. X.R.

260—286, 287, 690; 424—258